J. M. Baker,
Curry Comb.
No. 94,991.          Patented Sep. 21, 1869.
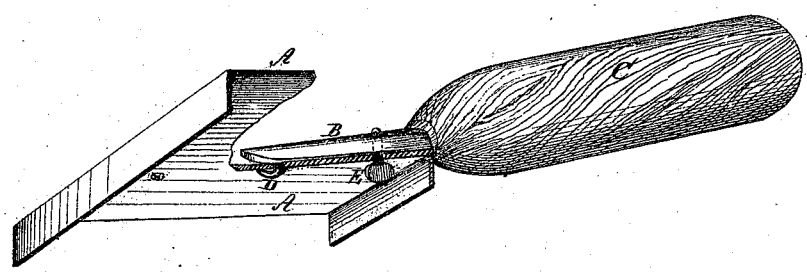
Witnesses
Wm F. Clark
Frank Blockley
Inventor:
J. M. Baker
per Munn
Attorneys.

United States Patent Office.

JOHN M. BAKER, OF MARSHFIELD, OHIO.

Letters Patent No. 94,991, dated September 21, 1869.

IMPROVED CURRY-COMB.

The Schedule referred to in these Letters Patent and making part of the same.

*To all whom it may concern:*

Be it known that I, JOHN M. BAKER, of Marshfield, in the county of Athens, and State of Ohio, have invented a new and useful Improvement in Curry-Combs; and I do hereby declare that the following is a full, clear, and exact description thereof, which will enable others skilled in the art to make and use the same, reference being had to the accompanying drawings, forming part of this specification, in which the figure is a perspective view of the comb-plate and handle of my improved curry-comb, part being broken away to show the construction.

My invention has for its object to improve the construction of curry-combs, so that when the front teeth have become worn, the comb-plate may be reversed or turned half way around, so that the rear teeth may become the front ones, enabling the curry-comb to be used much longer than it otherwise could be; and It consists in the construction of the handle and in the means by which the curry-comb is reversed, as hereinafter more fully described.

A represents the comb-plate, to which the combs or teeth-plates are attached in the ordinary manner.

B is the handle, to the outer end of which is attached a wooden hand-piece, C, in the ordinary manner.

The forward end of the handle B is secured to the centre of the comb-plate A by the hook-rivet D.

The forward end of the handle B is bevelled off upon its under side, from the hook-rivet D to its end, so much that the outer end of the handle B may be raised sufficiently to allow the wooden part, C, of said handle to pass over the back of the comb-plate in reversing it, the bend of the hook being made to correspond with the bevel of the end of the handle, so that when the said handle is secured in place the said comb-plate may be held securely.

The handle B is further secured to the comb-plate A by the thumb-screw E, passing through the plate A, and screwing into the handle B, or passing through the handle B and screwing into the plate A, as the construction of the curry-comb may render most convenient, the plate A having two holes formed in it equally distant from the hooked rivet D, for the reception of the said screw E.

By this construction, to reverse the comb-plate, the screw E is removed, and the outer end of the handle is raised, allowing the said comb-plate to be reversed, when it is again secured by the said screw E.

Having thus described my invention,

I claim as new, and desire to secure by Letters Patent—

1. A curry-comb, so constructed that the handle and comb-plate may be reversed in position relatively to each other, substantially as shown and described.

2. The combination of the comb-plate A, the two holes equally distant from the rivet D, the handle B having its front end bevelled, and the set-screw E and hooked-rivet D, all constructed, arranged, and operating as and for the purpose set forth.

JNO. M. BAKER.

Witnesses:
   THOMAS H. FERGUSON,
   W. J. HERRON.